United States Patent Office 3,823,185
Patented July 9, 1974

---

3,823,185
IMPROVED PROCESS FOR THE PREPARATION OF ETHOXYLATED ISETHIONATES
Irwin S. Schlossman, Cincinnati, Ohio, assignor to Emery Industries, Inc., Cincinnati, Ohio
No Drawing. Filed June 18, 1973, Ser. No. 370,899
Int. Cl. C07c *143/10*
U.S. Cl. 260—513 B          5 Claims

ABSTRACT OF THE DISCLOSURE

A process is provided whereby improvement of the production of ethoxylated isethionates in an aqueous medium is achieved. In this improved process the selectivity of ethylene oxide to the desired ethoxylated products is significantly increased by removal of all or a substantial part of the water present in the early stages of the reaction after a small amount of ethylene oxide has reacted. Additionally, ethoxylated isethionates having from about 2 to about 30 ethylene oxide repeating units and containing less than 25% undesirable glycol-ether by-products are provided.

BACKGROUND OF THE INVENTION

Ethoxylated isethionates, sometimes referred to as polyethylene glycol sulfonates, are conventionally prepared by the addition of ethylene oxide to either sodium bisulfite or sodium isethionate. For example, in U.S. Pat. 2,498,619 sodium bisulfite is reacted with from 5 to 30 mols of ethylene oxide to form the ethoxylated sulfonic acid salt which is then acidified with a strong mineral acid to yield the polyethylene glycol sulfonic acid. Such reactions, however, are complicated by the formation of undesirable glycol and glycol-ether by-products due to the reaction of the ethylene oxide with water which is generally considered to be the most acceptable medium for conducting the reaction. Inability to control the side reactions with the aqueous medium results in low yields of the desired ethoxylated product, based on the amount of ethylene oxide charged, and an impure product. When the amount of ethylene oxide is increased to obtain a high degree of ethoxylation the tendency to form glycols and glycol-ethers is proportionately increased and the selectivity of ethylene oxide to the desired product is lowered even further. For these reasons the production of ethoxylated isethionates in aqueous solutions generally has been considered to be extremely uneconomical, however, attempts to use other solvent systems have proven even less satisfactory.

It would be highly desirable and advantageous if a process for the production of ethoxylated isethionates, particularly isethionates containing a large amount of bound ethylene oxide, in an aqueous medium was available wherein high yields of the ethoxylated isethionate could be obtained based on the ethylene oxide charged. Improved selectivity of ethylene oxide to the desired ethoxylate products would result in considerable economic advantage in addition to making it possible to produce a product having improved purity.

SUMMARY OF THE INVENTION

We have now quite unexpectedly found that significant improvement in the production of ethoxylated isethionates in an aqueous medium is possible if all or a substantial portion of the water is removed from the reaction mixture in the early stages of the reaction after a small amount of ethylene oxide has been reacted. By employing a distillation or similar operation in the early stages of the reaction for removal of the water it has been found that the selectivity of the ethylene oxide to the desired ethoxylated products is significantly increased and that the formation of undesirable glycol and glycol-ether by-products is minimized.

In the process sodium bisulfite or sodium isethionate, which are dissolved in water, are first conventionally reacted with from about 0.5 to about 3 mols ethylene oxide and then all or a substantial part of the water is removed. At least about 75% of the water present in the reaction mixture should be taken off, however, the more complete the removal of the water, the higher the selectivity of ethylene oxide to the desired ethoxylated isethionates will be. Water removal may be achieved by vacuum distillation or the like at temperatures not to exceed 150° C. For optimum selectivity, less than about 3% by weight water will remain in the reaction mixture after the distillation. The ethoxylation is then continued in the usual manner by charging ethylene oxide to obtain the desired degree of ethoxylation. The resulting ethoxylated isethionate products, having from about 2 to about 30 repeating ethylene oxide units, typically contain less than about 25% by weight glycol-ether by-products.

DETAILED DESCRIPTION

The improved process of this invention relates to the preparation of ethoxylated isethionates having the formula

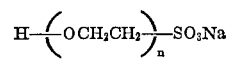

wherein $n$ is an integer from about 2 to about 30, more preferably from about 3 to 15, obtained by addition of ethylene oxide to sodium bisulfite, preformed or formed in situ by the reaction of sulfur dioxide and sodium hydroxide, or sodium isethionate. The present process enables more efficient utilization of ethylene oxide by improving the selectivity of the ethylene oxide for the ethoxylated isethionates. In other words, less ethylene oxide is required to obtain the same degree of ethoxylation because by-product formation is minimized. Ethoxylated isethionate yields as high as 90%, based on the ethylene oxide charge, are possible with this invention. Also, the formation of undesirable glycols and glycol-ether by-products is minimized with the result that the ethoxylated products are obtained in purer form.

The improvement of the present invention consists of distilling the reaction mixture to remove all or part of the water present in the reaction mixture after a small amount of the ethylene oxide has been reacted. After the distillation, the reaction is then continued in the usual manner by charging the remainder of the ethylene oxide and reacting until the desired degree of ethoxylation is achieved. It has unexpectedly been found that when the reaction is conducted employing a distillation or similar operation to remove water in the early stages of the reaction that the selectivity of the ethylene oxide for the ethoxylated isethionate is significantly improved.

The present process also makes it possible to obtain improved yields of the ethoxylated isethionates by virtue of reducing the amount of polyether glycol by-products formed. This is an extremely important aspect of this invention since it has heretofore not been possible, when conducting the ethoxylation in an aqueous medium, to obtain yields much in excess of 50% due to the competing reactions for the ethylene oxide—ethylene oxide reacts with water to give glycols and also interreacts with glycol by-products to produce polymeric ether-glycols. Some of these polyether glycols are not readily separable from the ethoxylated isethionates using conventional procedures, such as distillation, because of the similarities in structure and physical properties. In certain applications, however, such as when the ethoxylated isethionates are to be employed as additives to polyester fibers, the polyether glycols are undesirable. It is therefore highly desirable to minimize the amount of the undesirable by-products formed and obtain the ethoxylated isethionate in as pure a state as possible directly from the reaction. This is especially desirable if it can be accomplished while still obtaining high conversions of the ethylene oxide to the ethoxylated sodium isethionate. With the present process it is possible to significantly reduce the amount of polyether glycols formed and to directly obtain, without employing costly and time-consuming purification operations, ethoxylated isethionate products in good yield which contain less than 25% by weight polyether glycols. Through judicious selection of reaction conditions and removal of essentially all the water in the distillation step the amount of polymeric ether-glycol by-products may be reduced to about 10 to 20% or even lower with conversions of ethylene oxide to ethoxylated isethionates of about 70% and higher.

In its simplest terms the process of this invention can be broken down into three steps: (1) the initial ethoxylation, (2) the removal of water, and (3) the completion of the ethoxylation. These steps may be conducted as separate and distinct operations, as in a batch process, or they may be carried out consecutively as part of a single operation, that is, as a continuous or semi-continuous process. The equipment employed and the detailed procedures will vary depending on the type of operation involved and are not critical to the success of the process.

Sodium isethionate or sodium bisulfite may be used as reactants with the ethylene oxide. If sodium bisulfite is employed, it may be used as such or continuously formed in situ or in a separate reactor by the reaction of sulfur dioxide and sodium hydroxide as described in U.S. Pat. 2,810,747. This latter technique is especially useful when a continuous process is used, whereas with batch reactions the use of preformed sodium isethionate or sodium bisulfite is preferred.

The method employed to react the ethylene oxide is not critical and the reaction conditions and methods may be varied in accordance with established procedures known to those skilled in the art. Known ethoxylation procedures are used to react the ethylene oxide in both the pre-distillation and the post-distillation ethoxylation reactions. The essential feature of the present process lies solely in the discovery that removal of water from the reaction mixture after a small portion of the ethylene oxide is reacted gives significantly improved yields and purer products and that the selectivity of the ethylene oxide to the desired ethoxylated isethionates increases as the amount of water in the reaction mixture decreases. While catalysts are not essential to promote the ethoxylation reaction they may be advantageously employed. Any of the useful known basic catalysts for this purpose such as amines; amine salts of carboxylic acids; alkaline metal carbonates, alcoholates, hydroxides or salts of organic acids; and the like; may be used. Amines and alkali metal hydroxides, such as sodium and potassium hydroxide, are especially useful catalysts for this purpose.

The ethoxylation reactions will be conducted between about 40 and 200° C., preferably from about 60 to about 120° C. While the reaction may be conducted at atmospheric pressure in order to speed the rate of reaction it is generally conducted at a pressure of 20 p.s.i.g. or higher.

An amount of water sufficient to dissolve the sodium isethionate or sodium bisulfite is used to facilitate handling and provides a suitable medium in which the reaction will take place at a uniform and controllable rate. About 10 to about 50% by weight aqueous sodium bisulfite or sodium isethionate solutions are generally used. While water is advantageous in the early stages of the reaction, it has surprisingly been found that after a small amount of ethylene oxide has been reacted the amount of water can be significantly reduced or completely eliminated and still obtain a uniform and controlled rate of reaction in addition to obtaining other advantages.

The distillation step is typically conducted after about 0.5 to about 3.0 mols ethylene oxide have been charged to the reactor and allowed to react. If sodium isethionate is employed the amount of ethylene oxide initially reacted will range between about 0.5 and 3.0 mols per mol sodium isethionate before the water is removed, whereas with sodium bisulfite it is generally preferred that about 1.5 to 3.0 mols ethylene oxide per mol NaHSO$_3$ be reacted prior to the distillation or stripping. The exact amount of water which can be removed from the reactor without upsetting the balance of the reaction is dependent on the reaction conditions employed and the amount of ethoxylation which has already taken place. At least about 75%, and more preferably 90% or more, of the water will be removed. Excellent results are obtained with the present process when essentially all the water has been removed and the reaction mixture contains less than about 3% by weight water, based on the total reaction mixture, after the distillation step. In addition to the removal of water, some ethylene glycol and low molecular weight etherglycols will also be removed from the reaction mixture during the distillation or stripping. The manner in which this operation is conducted is not critical as long as removal of water is achieved without subjecting the reaction mixture to excessive temperatures. While the temperature and pressure can be varied in accordance with known distillation practices, generally, the temperature of the distillation should not exceed about 150° C. and preferably not in excess of 120° C. to avoid excessive decomposition of the ethoxylate.

A typical batch reaction is conducted by charging the aqueous solution of sodium bisulfite or sodium isethionate to the reactor which is then purged with an inert gas to displace air. The reactor and its contents are then heated to the desired reaction temperature and the inert gas released to a pressure of about 1 to 5 p.s.i.g. Ethylene oxide is then slowly charged to the reactor to bring the pressure to the desired level, generally between about 40 and 70 p.s.i.g. The temperature of the reaction is maintained and additional ethylene oxide is charged as required to maintain the desired pressure. Ethylene oxide addition is terminated after the desired amount (0.5–3 mols) ethylene oxide has been charged and the heating is continued for a period sufficient to insure essentially complete reaction of the ethylene oxide as evidenced by a decrease in the pressure. Water is then removed by distillation or similar stripping technique at a temperature below about 150° C. When the desired amount of water has been removed, the ethoxylation is continued employing the same procedure as described above. When the calculated amount of ethylene oxide has been charged the reaction is terminated by allowing the reaction to continue until the pressure decreases to about atmospheric. The cooled reaction mixture is discharged from the reactor. If a catalyst, such as sodium hydroxide, has been used it is customary to neutralize the catalyst by the addition of phosphoric acid or the like and remove any insoluble salts by filtration.

The reaction may also be conducted continuously or semi-continuously using suitable equipment. With continuous processes the reactants and catalysts are continuously fed into the reaction zone which may consist of a single reactor or a series of reactors maintained at the desired temperature and pressure to maintain an acceptable rate of reaction and obtain the desired degree of ethoxylation. If sodium bisulfite is used and directly formed by the reaction of sodium hydroxide and sulfur dioxide, this is conveniently accomplished in a separate reactor and the sodium bisulfite pumped directly to the reaction zone or to a holding tank. When the desired amount of the initial ethylene oxide charge is utilized, the aqueous solution containing the ethoxylated product and any by-products is transferred from the reaction zone to a stripper or other suitable apparatus for removal of the desired amount of water. When this has been accomplished, the ethoxylation is continued until the desired amount of ethylene oxide has been reacted.

The following example illustrates the improved process of this invention more fully, but should not be construed as a limitation on the scope thereof. Parts and percentages are on a weight basis unless otherwise indicated. Equipment used is constructed of glass or corrosion-resistant metals, such as stainless steel, to minimize contamination.

To demonstrate the superior results obtained in accordance with this invention by incorporating a distillation step in the early stages of the ethoxylation reaction sodium isethionate and ethylene oxide were reacted at a 2:1 molar ratio (ethylene oxide:sodium isethionate) employing a basic catalyst. To a stainless steel reactor was charged 83 parts sodium isethionate. The sodium isethionate was added as a 50% aqueous solution and contained 0.075% sodium hydroxide catalyst based on the sodium isethionate. The reactor was purged with nitrogen three times by pressurizing to 35 p.s.i.g. and then releasing the pressure and then finally pressured to 10 p.s.i.g. with nitrogen and the heating commenced. When the temperature reached about 75° C. the nitrogen pressure was released to 5 p.s.i.g. and ethylene oxide added to 35 p.s.i.g. After several minutes additional ethylene oxide was charged to increase the pressure to 50 p.s.i.g. The temperature was maintained between about 70° C. and 75° C. for about 3 hours with ethylene oxide being added as required to maintain 50 p.s.i.g. When 49 parts ethylene oxide had been added the ethylene oxide addition was terminated and the reaction continued for an additional 3 hours at about 75° C. during which time the pressure decreased to about 9 p.s.i.g. A vacuum was then pulled on the system and stripping of water and other low-boiling materials commenced. When about 50% of the theoretical amount of water, based on the reactant charge, was removed half of the reaction mixture was discharged and set aside for further ethoxylation. Stripping of the remaining portion of the reaction mixture was continued up to a maximum temperature of about 100° C. at 17 mm. Hg until essentially all the water was removed. The ethoxylate residue containing 1.3% water by analysis was filtered and also set aside for subsequent additional ethoxylation.

The ethoxylated reaction product containing 1.3% water was then further reacted with ethylene oxide by charging 450 gms. of the ethoxylate to which 0.1% by weight sodium hydroxide was added to a reactor and continuing the ethoxylation following the procedure previously described. The ethylene oxide pressure was maintained between about 50 and 60 p.s.i.g. throughout the run and the maximum reaction temperature was about 100° C. 668 Grams ethylene oxide were charged to the reactor over a 10 hour period. When essentially all of the charged ethylene oxide had reacted, the reaction mixture was heated while pulling a vacuum on the system to remove any light ends, such as low molecular weight glycols and ether-glycols, as is the customary practice at the conclusion of such ethoxylation processes. A pot temperature of 167° C. was reached at 0.7 mm. Hg but no light ends could be removed indicating that only high molecular weight products were obtained to the near complete exclusion of low molecular weight by-products. A 93.5% yield of product shown by analysis to consist of 81.5% ethoxylated sodium isethionate and 18.5% glycols was obtained. Percent sulfur (corrected for glycols) was 6.5%. This corresponds to a molecular weight for the ethoxylated product of 492. The ethoxylate thus contains about nine repeating ethylene oxide units on the average and corresponds to the formula $$H(OCH_2CH_2)_9SO_3Na.$$

Based on the total amount of ethylene oxide charged in both the pre-distillation and post-distillation ethoxylation reactions an 80% conversion ethylene oxide to the ethoxylated sodium isethionate was obtained.

To demonstrate the advantage of the present improved process the following ethoxylations were conducted for purposes of comparison employing conditions similar to those described above. In the first experiment the ethoxylation was conducted without a distillation step in the early stages of the reaction as follows: 148 grams sodium isethionate dissolved in 400 mls. water containing 0.3 gms. sodium hydroxide catalyst was reacted with 427 gms. ethylene oxide in accordance with the previously described procedures at a temperature of about 70° C. and a pressure of about 45–50 p.s.i.g. A yield of only 51.2% was obtained after distillation to remove the water and low molecular weight light ends. The final product contained 10.75% sulfur (uncorrected) and the ethoxylated sodium isethionate had an average molecular weight of 265, based on % S (corrected for glycols) which essentially corresponds to the formula $H(OCH_2CH_2)_4SO_3Na$. By conducting the reaction in this manner only about 31% of the ethylene oxide was converted to the ethoxylated product. Still another comparative experiment was conducted using 450 grams of the ethoxylated reaction mixture which had 50% by weight of the original water removed. This material was further ethoxylated by reacting 335 gms. ethylene oxide at 70° C. over a period of 6 hours. 453 Grams product (81% yield) was recovered after distillation at 164° C. and 1 mm. Hg to remove the light ends. The product contained 41% polyether glycols. The ethoxylated isethionate contained 9.83% sulfur (corrected for the glycols) corresponding to a molecular weight of 318 or a formula of $H(OCH_2CH_2)_5SO_3Na$. The ethylene oxide conversion to ethoxylated isethionates was only about 42% when only 50% of the water is removed.

When the above procedures are repeated using sodium bisulfite as the starting reactant in place of sodium isethionate similar improved results are obtained with the ethoxylations conducted in accordance with the present process. Employing sodium bisulfite about 2 mols ethylene oxide per mol sodium bisulfite are charged and reacted before removal of the water.

The ethoxylated products prepared by the process of this invention are useful for a variety of applications known to the art. The materials may be employed as surface active agents and possess excellent wetting characteristics. They may function as solubilizing agents, foam stabilizers or the like.

I claim:

1. In a process for preparing ethoxylated sodium isethionate by the ethoxylation of sodium bisulfite or sodium isethionate in an aqueous alkaline solution at a temperature from about 40° C. to 200° C., the improvement comprising removing at least about 70 percent by weight of the water present in the reaction mixture by distilling at a temperature not to exceed 150° C. after about 0.5 to about 3.0 mols ethylene oxide per mole of sodium bisulfite or sodium isethionate have reacted and then continuing the ethoxylation.

2. The process of Claim 1 wherein 90% or more of the water is removed.

3. The process of Claim 2 wherein essentially all the water is removed from the reaction mixture by vacuum distillation at a temperature not to exceed 120° C.

4. An ethoxylate composition obtained by the process of Claim 1.

5. An ethoxylate composition obtained by the process of claim 3.

References Cited

UNITED STATES PATENTS 2,810,747  10/1957  Sexton et al. _____ 260—513 B

LEON ZITVER, Primary Examiner

N. CHAN, Assistant Examiner